(12) United States Patent
Kang et al.

(10) Patent No.: US 10,263,281 B2
(45) Date of Patent: Apr. 16, 2019

(54) ALL-SOLID ION BATTERY

(71) Applicants: SEOUL NATIONAL UNIVERSITY R&DB FOUNDATION, Seoul (KR); KOREA ADVANCED INSTITUTE OF SCIENCE AND TECHNOLOGY, Daejeon (KR)

(72) Inventors: Ki Suk Kang, Seoul (KR); In Sang Hwang, Seoul (KR); Yeon Sik Jung, Sejong (KR); Jung Keun Yoo, Daejeon (KR); Jae Beom Jeon, Seoul (KR); Ki Ung Jeon, Seoul (KR)

(73) Assignees: SEOUL NATIONAL UNIVERSITY R&DB FOUNDATION, Seoul (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 15/540,351

(22) PCT Filed: Sep. 23, 2015

(86) PCT No.: PCT/KR2015/009983
§ 371 (c)(1),
(2) Date: Jun. 28, 2017

(87) PCT Pub. No.: WO2016/108399
PCT Pub. Date: Jul. 7, 2016

(65) Prior Publication Data
US 2017/0365877 A1 Dec. 21, 2017

(30) Foreign Application Priority Data
Dec. 29, 2014 (KR) .................. 10-2014-0192288

(51) Int. Cl.
| | | |
|---|---|---|
| H01M 10/0565 | (2010.01) | |
| H01M 10/0562 | (2010.01) | |
| H01M 10/0525 | (2010.01) | |
| H01M 10/0585 | (2010.01) | |

(52) U.S. Cl.
CPC ... H01M 10/0565 (2013.01); H01M 10/0525 (2013.01); H01M 10/0562 (2013.01); H01M 10/0585 (2013.01); H01M 2300/0068 (2013.01); H01M 2300/0071 (2013.01); H01M 2300/0082 (2013.01); H01M 2300/0094 (2013.01)

(58) Field of Classification Search
CPC ........ H01M 10/0565; H01M 10/0525; H01M 10/0562; H01M 10/0585
See application file for complete search history.

(56) References Cited

FOREIGN PATENT DOCUMENTS

| | | |
|---|---|---|
| JP | 11-007942 | 1/1999 |
| JP | 2004-158286 | 6/2004 |
| KR | 1020050043674 A | 5/2005 |

(Continued)

*Primary Examiner* — Helen Oi K Conley
(74) *Attorney, Agent, or Firm* — Stuart H. Mayer; Mayer & Williams PC

(57) ABSTRACT

The present invention provides an all-solid ion battery having improved stability and power characteristics and comprising: a powder-form solid electrolyte; a powder-form electrode active material; a first conductive polymer coating film coated on at least a portion of the solid electrolyte and capable of transporting ions; and a second conductive polymer coating film coated on at least a portion of the electrode active material and capable of transporting ions and electrons.

4 Claims, 2 Drawing Sheets

(56) References Cited

FOREIGN PATENT DOCUMENTS

| | | | |
|---|---|---|---|
| KR | 10-2013-000227 | A | 1/2013 |
| KR | 1020140119250 | A | 10/2014 |
| WO | 2012/157119 | A1 | 11/2012 |

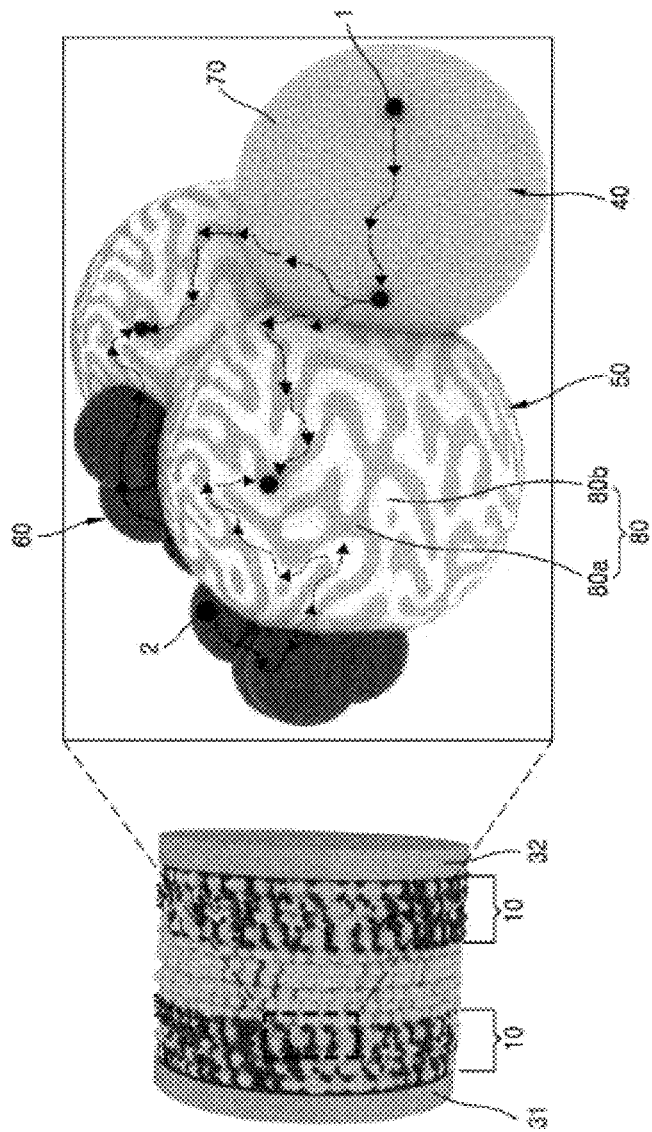

[FIG. 2]
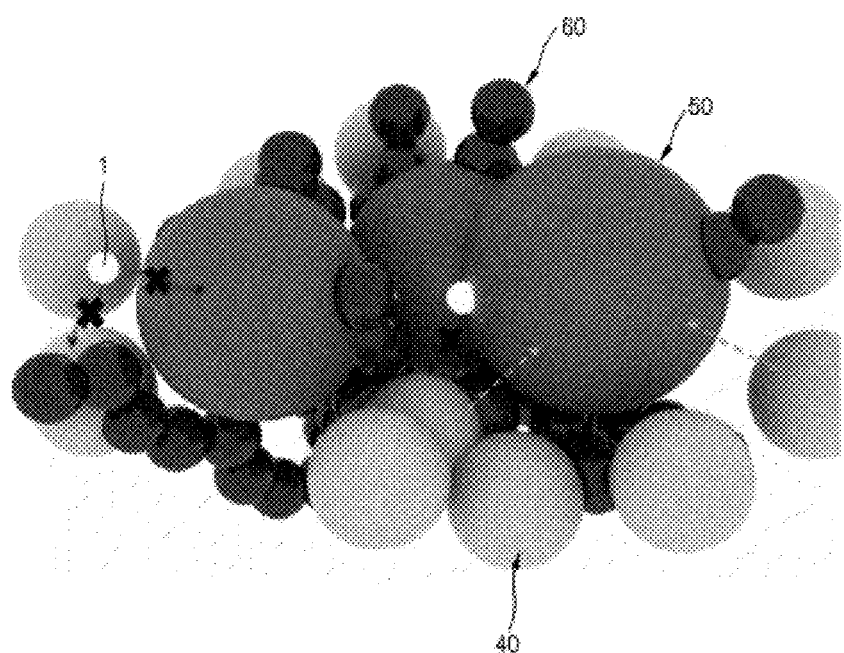

ALL-SOLID ION BATTERY

TECHNICAL FIELD

The present invention relates to a lithium secondary battery technology, and more particularly, to an all-solid ion battery.

BACKGROUND ART

In general, the technology of lithium secondary battery is applied in various fields at present through recent remarkable developments, and various batteries that can overcome the limitations of lithium secondary batteries are being studied from the viewpoints of capacity, stability, power, enlargement and miniaturization of batteries. Representatively, compared to conventional lithium secondary batteries, metal-air batteries having large theoretical capacity in terms of capacity, all-solid batteries having no risk of explosion in terms of stability, supercapacitors having advantages in terms of power, NaS batteries or redox flow batteries (RFB) in terms of enlargement and thin film batteries in terms of miniaturization are continuously studied in academia and industries.

The all-solid battery which replaces the liquid electrolyte used in conventional lithium secondary batteries with solid electrolyte can significantly improve safety because there are no explosion or ignition due to the decomposition reaction of the electrolytic solution or likes. Furthermore, because Li-metal or Li-alloy can be used as an anodic material, the all-solid battery has an advantage of remarkably improving the energy density for the mass and the volume of the battery.

DETAILED DESCRIPTION OF THE INVENTION

Technical Problem

However, when such conventional solid electrolytes are used, it is problematic that the performance of a battery is deteriorated due to the solid electrolyte's low ionic conductivity and worse state of the electrode/electrolyte interface than when liquid electrolytes are used.

Accordingly, the present invention has been made to solve various problems including the above problems, and it is an object of the present invention to provide an all-solid ion battery having improved stability and power characteristics. However, these problems are illustrative, and thus the scope of the present invention is not limited by these.

Technical Solution

According to an aspect of the present invention, there is provided an all-solid ion battery that includes a powder-form solid electrolyte; a powder-form electrode active material; a first conductive polymer coating film coated on at least a portion of the solid electrolyte and capable of transporting ions; and a second conductive polymer coating film coated on at least a portion of the electrode active material and capable of transporting ions and electrons.

The all-solid ion battery of above, the first conductive polymer coating film may include PEO(polyethylene oxide).

The all-solid ion battery of above, the second conductive polymer coating film may include PEO(polyethylene oxide)-PEDOT(poly(3,4-ethylenedioxythiophene) block copolymer.

The all-solid ion battery of above, the first conductive polymer coating film and the second conductive polymer coating film may be softer than the electrode active material.

The all-solid ion battery of above, the solid electrolyte may include at least one of $Li_{1+x+y}Al_x(Ti,Ge)_{2-x}Si_yP_{3-y}O_{12}$ ($0<x<1$, $0<y<3$), $xLi_2S$-$(100-x)P_2S_5$($65<x<85$, mol %)-based glass or glass-ceramic electrolyte, $Li_xMP_2X_{12}$ ($x=9,10$ or $11$, $A=Ge$, Si, Sn, Al, P, $X=O$, S or Se), $Li_{3.25}Ge_{0.25}P_{0.75}S_4$, $Li_6PS_5X$ ($x=F$, Cl, Br, I), $Li_7P_3S_{11}$ and $Li_{3.25}P_{0.95}S_4$, and the electrode active material may include at least one of $Li_{1+x}M_{1-x-y}Al_yO_2$ ($0<x<1$, $M=Co$, Ni, Mn, Fe), $LiMPO_4$($M=Co$, Ni, Mn, Fe), $Li_4Ti_5O_{12}$, graphite and $Li_xNa_{4-x}M_3(PO_4)_2(P_2O_7)$ ($0<x<3$, $M=Co$, Ni, Fe, Mn).

Advantageous Effects

According to an embodiment of the present invention as described above, it is possible to provide an all-solid ion battery having improved stability and power characteristics. Of course, the scope of the present invention is not limited by these effects.

DESCRIPTION OF THE DRAWINGS

FIG. 1 schematically shows an all-solid ion battery according to embodiments of the present invention.

FIG. 2 schematically shows an all-solid ion battery according to comparative examples of the present invention.

MODE OF THE INVENTION

Hereinafter, embodiments of the present invention will be described in detail with reference to the accompanying drawings. However, the present invention is not limited to the embodiments described below but may be embodied in various other forms. The following embodiments are provided to make disclosed contents thorough and complete and to fully illustrate the scope of the invention to those of ordinary skill in the art. Also, for convenience of explanation, the components may be exaggerated or reduced in size.

FIG. 1 schematically shows an all-solid ion battery according to embodiments of the present invention.

Referring to FIG. 1, the all-solid ion battery according to embodiments of the present invention may be implemented by including a solid electrolyte, an electrode active material, a first conductive polymer coating film coated on at least a portion of the solid electrolyte and a second conductive polymer coating film coated on at least a portion of the electrode active material.

For examples, the all-solid ion battery according to embodiments of the present invention may include a cathode 10 having a cathodic material for storing lithium ions during discharging. Furthermore, the all-solid ion battery may include an anode 20 having an anodic material for storing lithium ions during charging.

The cathode 10 is an electrode in which the cathodic material is reduced by receiving electrons from an external electric wire during the discharge process, and may include a current collector 31 collecting electrons and transporting the electrons to an external electric wire, an electrode active material 50 having a structure capable of inserting and desorbing lithium ions, a solid electrolyte 40 and carbon 60. The current collector 31 may include an aluminum.

Furthermore, the anode 20 is an electrode that emits electrons to an external electric wire while the anodic material is oxidized during the discharge process, and may include a current collector 32 collecting electrons and transporting the electrons to the external electric wire, an electrode active material 50 having a structure capable of inserting and desorbing lithium ions, a solid electrolyte 40 and carbon 60. The current collector 32 may include a copper.

Here, the solid electrolyte 40 and the electrode active material 50 that are included in the cathode 10 and the anode 20, may be a powder-form. Furthermore, the solid electrolyte 40 may include a first conductive polymer coating film that is coated on at least a portion of the solid electrolyte and capable transporting the ions 1. Furthermore, the electrode active material 50 may include a second conductive polymer coating film that is coated on at least a portion of the electrode active material and capable of transporting the ions 1 and the electrons 2.

The solid electrolyte is a medium in which a mass transfer (i.e. ions 1) takes place such that the reduction of the cathode 10 or the oxidation of the anode 20 maintains a chemical balance, and may, for example, include $Li_{1+x+y}Al_x(Ti,Ge)_{2-x}Si_yP_{3-y}O_{12}$ ($0<x<1$, $0<y<3$), $xLi_2S\text{-}(100\text{-}x)P_2S_5$ ($65<x<85$, mol %)-based glass or glass-ceramic electrolyte, $Li_{3.25}Ge_{0.25}P_{0.75}S_4$, $Li_{3.25}P_{0.95}S_4$, $Li_xMP_2X_{12}$ ($x=9,10$ or $11$, $A=Ge, Si, Sn, Al, P, X=O, S$ or $Se$), $Li_6PS_5X$ ($x=F, Cl, Br, I$), $Li_7P_3S_{11}$ and and so on.

The first conductive polymer coating film 70 coated on at least a portion of the solid electrolyte 40 may, for example, include PEO(polyethylene oxide), Polyether, Polysaccharide, Poly(vinyl alcohol), Poly(vinyl pyrrolidone), Poly(p-phenylene), Poly(propylene oxide), Poly(styrene), Poly(m-ethyl methacrylate), Polyphosphazene, Poly(acrylamide), Poly(acrylic acid), etc. having excellent ionic conductivity.

The electrode active material 50 may, for example, include $Li_{1+x}M_{1-x-y}Al_yO_2$ ($0<x<1$, $M=Co, Ni, Mn, Fe$), $LiMPO_4$ ($M=Co, Ni, Mn, Fe$), $Li_4Ti_5O_{12}$, graphite, $Li_xNa_{4-x}M_3(PO_4)_2(P_2O_7)$ ($0<x<3$, $M=Co, Ni, Fe, Mn$) and so on.

The second conductive polymer coating film 80 coated on at least a portion of the electrode active material 50 may include an ionic conductive polymer 80a with excellent ionic conductivity and an electronic conductive polymer 80b with excellent electronic conductivity. For example, the second conductive polymer coating film may include PEO (poly ethylene oxide)-PEDOT(poly(3,4-ethylenedioxythiophene) block copolymer having excellent ionic conductivity and electronic conductivity.

Furthermore, the electrode active material 50, which is coated with the PEO(poly ethylene oxide)-PEDOT(poly(3, 4-ethylenedioxythiophene) block copolymer, may serve as a transporting path of the ions 1 and the electrons 2. For example, the PEO-coated portion of the electrode active material 50 may serve as a path for transporting the ions 1 and the PEDOT-coated portion may serve as a path for transporting the electrons 2.

Furthermore, the ionic conductive polymer 80a may, for example, include PEO(polyethylene oxide), Polyether, Polysaccharide, Poly(vinyl alcohol), Poly(vinyl pyrrolidone), Poly(p-phenylene), Poly(propylene oxide), Poly(styrene), Poly(methyl methacrylate), Polyphosphazene, Poly(acrylamide), Poly(acrylic acid), etc. having excellent ionic conductivity.

Furthermore, the electronic conductive polymer 80b may, for example, include PA(polyacetylene), PPP(poly(p-phenylene)), PANI(polyaniline), PTh(polythiophene), PPS(poly(p-phenylene sulfide)), PPy(polypyrrole), PPV(poly(p-phenylene vinylene)), PMT(poly(3-methylthiophene)), PTT (poly(thienothiophene)), P3HT(poly(3-hexylthiophene)), PFl(polyfluorene), PCz(poly(Carbazole)), PITN(polyisothianaphthene), PQ(polyquinoline), PTP(poly(triphenylene)), PNap(polynaphthalene), PTV(poly(thienylene vinylene)), PAS(polyacenes), PDTT(poly(dithienothiophene)), PEDOT (poly(3,4-ethylenedioxythiophene)), PFu(polyfuran) and so on.

The above-described first conductive polymer coating film 70 and second conductive polymer coating film 80 may be respectively coated on at least a portion of the solid electrolyte 40 and the electrode active material 50, and creates a solid-solid surface contact between the solid electrolyte 40 and the electrode active material 50, thereby increasing the contact area. Furthermore, as the contact area increases, the power and lifetime characteristic of the all-solid ion battery can be increased.

Furthermore, the first conductive polymer coating film 70 and the second conductive polymer coating film 80 may be softer than the electrode active material 50. The first conductive polymer coating film 70 and the second conductive polymer coating film 80, which are softer than the electrode active material 50, can increase the power of the all-solid ion battery by absorbing the change in volume of the electrode active material 50 that occurs during charging and discharging of the all-solid ion battery. Furthermore, the first conductive polymer coating film 70 and the second conductive polymer coating film 80 can increase the lifetime characteristics of the all-solid ion battery.

In general, unlike primary batteries which cannot be recharged, secondary batteries are capable of being recharged and discharged, and used widely in high-tech electronic devices such as mobile phones, laptop computers, and camcorders and so on. Particularly, the use of a lithium secondary battery is rapidly increasing since it has an operating voltage of 3.6 V, which is three times higher than that of a nickel-cadmium (Ni—Cd) battery or a nickel-hydrogen (Ni—H) battery used widely in power sources for electronic equipment, and a high energy density per unit weight.

A lithium ion secondary battery includes an electrode assembly, a case accommodating the electrode assembly and a cap assembly coupled to the case. The electrode assembly includes a cathode plate, an anode plate and a separator interposed therebetween. The cathode plate and the anode plate are manufactured by coating an electrode active material on a current collector, respectively. However, a conventional lithium ion secondary battery uses a liquid or polymer electrolyte, and therefore has a risk of exploding due expansion caused by repetitive charging and discharging reactions.

The all-solid ion battery which does not have a risk of exploding in terms of safety can significantly improve the safety since the all-solid ion battery replaces the liquid electrolyte used in a conventional lithium secondary battery with a solid electrolyte and therefore no ignition or explosion by the decomposition reaction of the electrolyte occurs. Furthermore, it is possible to dramatically improve the energy density per mass and volume since Li-metal or Li-alloy can be used as an anodic material. Also, the all-solid ion battery can have a high power density.

However, when a solid electrolyte is used, it was problematic that the performance of a battery is deteriorated due to the solid electrolyte's low ionic conductivity and poor state of electrode/electrolyte interface than when the liquid electrolyte is used.

The above-described problems can be solved by the solid electrolyte that is coated with the first conductive polymer coating film and the electrode active material that is coated with the second conductive polymer coating film of the all-solid ion battery according to embodiments of the present invention.

FIG. 2 shows an all-solid ion battery according to comparative examples of the present invention. The all-solid ion battery includes a solid electrolyte 40 that does not include a first conductive polymer coating film and a second conductive polymer coating film, an electrode active material 50 and carbon 60. FIG. 2 shows that the solid electrolyte 40 and the electrode active material 50 are spaced apart from each other or in point contact with a narrow area of contact. As a result, it is confirmed that the transporting of the ions 1 between the solid electrolyte 40 and the electrode active material 50 is not smooth.

However, the all-solid ion battery according to embodiment of the present invention can increase the contact area between particles by making surface contact from a solid-solid point contact between the solid electrolyte 40 at least a portion of which is coated with the first conductive polymer coating film and the electrode active material 50 at least a portion of which is coated with the second conductive polymer coating film.

Furthermore, the all-solid ion battery according to embodiment of the present invention can increase the power and lifetime of the all-solid ion battery with the first conductive polymer coating film and the second conductive polymer coating film absorbing the change in volume of the electrode active material that occurs during charging and discharging of the all-solid ion battery.

While the present invention has been particularly shown and described with reference to embodiments thereof, it will be understood by one of ordinary skill in the art that various changes in form and details may be made therein without departing from the scope of the present invention. Therefore, the true scope of the invention is defined by the following claims of the invention.

The invention claimed is:

1. An all-solid ion battery comprising:
   a powder-form solid electrolyte;
   a powder-form electrode active material;
   a first conductive polymer coating film coated on at least a portion of the solid electrolyte and capable of transporting ions; and
   a second conductive polymer coating film coated on at least a portion of the electrode active material and capable of transporting ions and electrons,
   wherein the second conductive polymer coating film includes PEO (polyethylene oxide)-PEDOT (poly(3,4-ethylenedioxythiophene) block copolymer.

2. The all-solid ion battery of claim 1, wherein the first conductive polymer coating film includes PEO(polyethylene oxide).

3. The all-solid ion battery of claim 1, wherein the first conductive polymer coating film and the second conductive polymer coating film are softer than the electrode active material.

4. The all-solid ion battery of claim 1, wherein the solid electrolyte includes at least one of $Li_{1+x+y}Al_x(Ti,Ge)_{2-x}Si_yP_{3-y}O_{12}$ (0<x<1, 0<y<3), $xLi_2S\text{-}(100\text{-}x)P_2S_5$ (65<x<85, mol %)-based glass or glass-ceramic electrolyte, $Li_xMP_2X_{12}$ (x=9,10 or 11, A=Ge, Si, Sn, Al, P, X=O, S or Se), $Li_{3.25}Ge_{0.25}P_{0.75}S_4$, $Li_6PS_5X$ (x=F, Cl, Br, I), $Li_7P_3S_{11}$ and $Li_{3.25}P_{0.95}S_4$; and
   wherein the electrode active material includes at least one of $Li_{1+x}M_{1-x-y}Al_yO_2$ (0<x<1, M=Co, Ni, Mn, Fe), $LiMPO_4$ (M=Co, Ni, Mn, Fe), $Li_4Ti_5O_{12}$, graphite and $Li_xNa_{4-x}M_3(PO_4)_2(P_2O_7)$ (0<x<3, M=Co, Ni, Fe, Mn).

* * * * *